United States Patent Office 3,211,783
Patented Oct. 12, 1965

3,211,783
PROCESS OF PREPARING SALTS OF MONOSULFONIC ACIDS OF MONOHYDRIC AND DIHYDRIC OLEFINIC ALCOHOLS
Otto F. Hecht, Easton, Pa., assignor to General Aniline & Film Corporation, New York, N.Y., a corporation of Delaware
No Drawing. Filed Oct. 1, 1963, Ser. No. 312,889
3 Claims. (Cl. 260—513)

This application is a continuation-in-part of my application Serial No. 130,445, filed on June 29, 1961, now abandoned.

This invention relates to a process of preparing ammonium and alkali metal salts of monosulfonic acids of monohydric and dihydric olefinic alcohols of from 3 to 4 carbon atoms.

The preparation of salts of olefinic sulfonic acids by the reaction of salts of sulfurous acid with acetylenic compounds free from acyl or carboxylic ester groups in 2-position, i.e. adjacent to the carbon-to-carbon triple bond linkage, is described in French Patent 858,185. The procedure involves the addition of either 1 or 2 moles of sodium bissulfite to 2 butyne-1,4-diol whereby the double addition product is only obtained. There is no teaching or suggestion in said patent of the preparation of the monoaddition product containing an olefinic linkage. In other words, there is no precise method for the preparation of a well-defined mono bisulfite addition product. Of the four illustrative examples in said patent, only Example 3 yields a mixture of the mono and double addition products which cannot be separated.

The monoaddition products of the formulae:

(a) 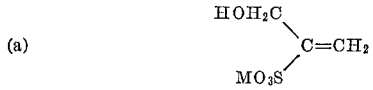

and (b) 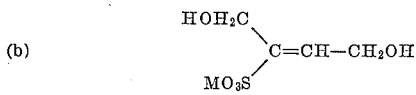

wherein M represents ammonium or an alkali metal group such as lithium, potassium or sodium cannot be prepared by following the procedure of the foregoing French patent because of the tendency of such products to readily polymerize and yield the corresponding cyclic trimers of the formulae:

(a') 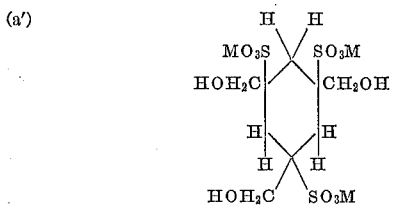

and (b') 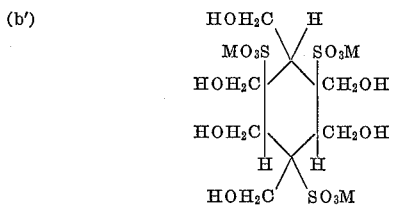

Accordingly, therefore, the principal object of the present invention is to provide a procedure whereby the monomeric olefinic products of formulae (a) and (b) are obtained in fairly high yields and free from polymerized by-products.

I have found that the foregoing object is accomplished by conducting the monoaddition reaction of about 1 mole of an ammonium or alkali metal sulfite or bisulfite with 1 mole of either 2-butyne-1,4-diol or 2-propyn-1-ol (propargyl alcohol) in the presence of inositol as a stabilizer.

The reaction is readily performed by refluxing an aqueous solution of 1 mole of 2-butyne-1,4-diol or propargyl alcohol in which the stabilizer has been dissolved with about an equimolecular amount of either ammonium or alkali metal sulfite or bisulfite. The aqueous solution of the acetylenic alcohol is first prepared by dissolving 1 mole of the alcohol in parts by weight in 2½ to 3 parts by weight of water. To the resulting solution is then added 1 part by weight of the stabilizer and approximately 1 mole by weight of either the ammonium or alkali metal sulfite or bisulfite. The resulting solution is then refluxed for a period of time ranging from 2 to 3 hours under a nitrogen blanket while agitating with a glass or Teflon-stirrer. The reaction temperature is about 100°–110° C. After the reaction has been completed, it is absolutely essential that the pH of the reaction mixture be not lower than 5.5 and should measure a pH of 6–6.8, preferably a pH of 6.3. The pH can be adjusted by addition of 6.5% sodium bicarbonate solution. However, no adjustment is required when working according to the conditions disclosed in Examples I and II. The reaction mixture is vaporized at a pot temperature at about 25° to 45° C. (bath temperature ranging from 47° to about 62° C.) and a pressure of about 0.2–10.0 mm. mercury gauge. The distillation temperature under these conditions ranges from 25° to 35° C. The wet residue yields after drying about 62%–72% of theory of the ammonium or alkali metal 2-butene-1,4-diol-3-sulfonate or the corresponding salt of 1-hydroxy-2-propene-2-sulfonic acid.

The resulting salt is readily polymerized with potassium persulfate at a temperature of about 55–65° C. in 20% aqueous solution buffered within a pH range of 3.0 and 4.6. A completely saturated white polyelectrolyte is obtained.

When no stabilizer is employed, there is obtained after 2½ hours of refluxing under the same conditions a brownish polymerization product instead of the reactive monomer.

The inositol which I found to be effective as a stabilizer is both water and alcohol-soluble so that it may be readily removed from the reaction mixture prior to polymerization of the monomeric product if so desired. The concentration of inositol ranging from about 0.02%–2.0% based on the weight of the resulting monomeric product is usually sufficient to inhibit the undesired polymerization.

In conducting the monoaddition reaction, it is necessary to avoid the use of a large excess of either the foregoing sulfites or bisulfites over the stoichiometrical amount because the double addition compound will be formed. For practical purposes, I have found that from 0.95–1.05 mole of either the sulfite or bisulfite salt per mole of the acetylenic alcohol is sufficient without the danger of formation of the double addition product.

The reaction can be readily performed either at atmospheric or super-atmospheric pressure. In any case, it is advantageous to conduct the reaction under a nitrogen blanket whereby snow-white products of definite monomolecular structure are obtained. Usually the reaction is complete or substantially complete after a period of 2 to 3 hours of gentle refluxing with good agitation. The reaction solution is then cooled, preferably under ice cooling, so that crystals are obtained. However, when working according to this method, the yield is only moderate. A uniform reaction product in fairly high yields is obtained by vaporizing the volatiles of the reaction solution at pressures between 0.2–10 mm. mercury gauge. The pure reaction product is obtained as a residue. The pot temperature should never be permitted to rise above 45° C. because of the eagerness of the salt of the resulting olefinic sulfonic acid to polymerize or cyclize to trimers.

The resulting monomer salt of the 2-butene-1,4-diol-2-sulfonic acid or 1-hydroxy-2-propene-2-sulfonic acid, respectively, can be easily recrystallized, e.g., from ethanol or a mixture of dimethylformamide and water.

The following examples will illustrate the procedure for preparing the foregoing monomeric products of formulaes (a) and (b). All parts given are by weight.

*Example I*

86 parts (1 mole) of crystallized distilled 2-butyne-1,4-diol (B.P.$_{1.2}$=116° C., B.P.$_{1.3}$=117° C.) were dissolved in 240 parts of water. In this solution, there was dissolved 1 part of inositol as a stabilizer. Finally, 105 parts of sodium bisulfite of 99.2% purity (1 mole) were added to the resulting solution. The reaction mixture was then refluxed for 2½ hours under a nitrogen blanket, employing a glass stirrer. The reaction temperature was about 106° C.

After the reaction was finished, the reaction solution showed a pH of 6.3. The reaction solution was vaporized at a pot temperature of 25°–36° C. (bath temperature: 47° to 62° C.) and a pressure of 0.2–0.7 mm. mercury gauge. The distillation temperature under these conditions was 25° C. to 36° C. There were obtained 172 parts of aqueous distillate and 185 parts of a wet residue, which yielded after drying 136 parts of sodium 2-butene-1,4-diol-2-sulfonate (71.6% of the theory).

The resulting salt was polymerized with potassium-persulfate at 55°–65° C. in 20% aqueous solution buffered within a pH-range of 3.0 and 4.6. A completely saturated white polyelectrolyte was obtained.

When using no stabilizer, there was obtained after 2½ hours of refluxing under the same conditions only a brownish polymerized product instead of a reactive monomer.

When employing 120 parts of potassium bisulfite instead of 104 parts sodium bisulfite, the white potassium salt was obtained.

*Example II*

460 parts of propynol 48.8% (=224 parts propynol 100%) (4 moles) were diluted with 564 parts of water. To the resulting aqueous solution, there were then added 6 parts of inositol as stabilizer. Finally 420 parts of sodium bisulfite of 99.2% purity (4 moles) were added to the solution. The resulting solution was refluxed for 2½ hours under a nitrogen blanket while employing a glass stirrer. The reaction temperature was 102° C.

After the reaction had been completed, the pH was 6.3. The resulting solution was vaporized at a head temperature of 23° to 26° C. and a pressure of 1.3 to 2.3 mm. mercury gauge. The solution temperature was up to 38° C. There was then obtained 893 parts of aqueous distillate containing no propynol and a wet residue, which yielded after drying under nitrogen 396 parts of sodium 1-hydroxy-2-propene-2-sulfonic acid, corresponding to a yield of 62%.

*Example III*

246 parts of a technical 35% butynediol aqueous solution, containing 0.5% formaldehyde and 1.0% propynol, was diluted with 80 parts of water. (The aqueous butynediol solution was obtained by the reaction of acetylene with aqueous formaldehyde in presence of a cuprous acetylide catalyst as described in U.S.P. 2,232,867; 2,300,969; 2,768,215 and 2,840,618.) In this solution, there is dissolved 1 part of inositol as a stabilizer. Finally 108 parts of sodium bisulfite of 95.4% purity were added to the resulting solution. The reaction mixture was then refluxed for 2½ hours under a nitrogen blanket, while employing a Teflon stirrer. The reaction temperature was 106° C. to 107° C.

The further treatment of the reaction solution corresponded completely to the procedure described in Example 1.

There were obtained ca. 130 parts of sodium 2-butene-1,4-diol-2-sulfonate (68.4% of the theory). The purity of the product is not as high as the one obtained from pure butynediol because it contains a small amount of the propynol-monoaddition product and traces of sodium formaldehyde bisulfite addition product.

It is to be noted that in this example neither phenols nor urea nor thiourea can be used as stabilizers with technical butynediol because these stabilizers are immediately inhibited under resin formation by the formaldehyde present in the technical butynediol solution.

The ammonium and alkali metal salts of the 2-butene-1,4-diol-2-sulfonic acid and 1-hydroxy-2-propene-2-sulfonic acid prepared in accordance with the present invention are extremely effective in producing bright, ductile nickel electro-deposits when incorporated as additives in nickel electroplating baths. Although a concentration of about 0.2 gram per liter of nickel bath was effective, a concentration of about 0.8 gram per liter gave the optimum brightness. The dimers, trimers and higher polymers of these salts are equally useful in electroplating baths as primary additives.

I claim:

1. The process of preparing a salt of the formula:

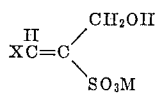

wherein M represents a monovalent cation selected from the group consisting of ammonium and alkali metal salts, and X represents a member selected from the class consisting of hydrogen and —CH$_2$OH group, which comprises reacting at a temperature of from 100° to 125° C. an aqueous solution containing 1 mole of a salt of sulfurous acid selected from the class consisting of ammonium and alkali metal salts and 1 mole of an alkynol selected from the class consisting of 2-propyn-1-ol and 2-butyne-1,4-diol in a nitrogen atmosphere and in the presence of a stabilizing amount of inositol at a pH of 6 to 6.8 for a period of time ranging from 2 to 3 hours, vaporing the resulting reaction solution at a pot temperature of about 25° to 45° C. and a pressure of about 0.2 to 10 mm. mercury gauge, drying the resulting wet residue, and recovering the said salt.

2. The process of preparing a salt of the formula:

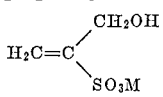

wherein M represents a monovalent cation selected from the group consisting of ammonium and alkali metal salts, which comprises reacting at a temperature of from 100° to 125° C. an aqueous solution containing 1 mole of a salt of sulfurous acid selected from the class consisting of ammonium and alkali metal salts and 1 mole of 2-propyn-1-ol in a nitrogen atmosphere and in the presence of a stabilizing amount of inositol at a pH of 6 to 6.8 for a period of time ranging from 2 to 3 hours, vaporing the resulting reaction solution at a pot temperature of about 25° to 45° C. and a pressure of about 0.2 to 10 mm. mercury gauge, drying the resulting wet residue, and recovering the said salt.

3. The process of preparing a salt of the formula:

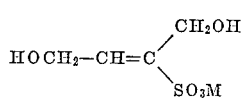

wherein M represents a monovalent cation selected from the group consisting of ammonium and alkali metal salts, which comprises reacting at a temperature of from 100° to 125° C. an aqueous solution containing 1 mole of a salt of sulfurous acid selected from the class consisting of ammonium and alkali metal salts and 1 mole of 2-butyne-1,4-diol in a nitrogen atmosphere and in the presence of a stabilizing amount of inositol at a pH of 6 to 6.8 for a period of time ranging from 2 to 3 hours, vaporing the resulting reaction solution at a pot temperature of about 25° to 45° C. and a pressure of about 0.2 to 10 mm. mercury gauge, drying the resulting wet residue, and recovering the said salt.

References Cited by the Examiner
UNITED STATES PATENTS
3,002,903  10/61  Foulke et al. _____ 260—513

LORRAINE A. WEINBERGER, *Primary Examiner.*